US012798386B2

(12) United States Patent
De Kreij et al.

(10) Patent No.: US 12,798,386 B2
(45) Date of Patent: Nov. 17, 2026

(54) BATTERY MANAGEMENT SYSTEM, ELECTRIC VEHICLE, METHOD AND CONTROL UNIT

(71) Applicant: LIGHTYEAR IPCO B.V., Helmond (NL)

(72) Inventors: Egbert Willem Nicolaas De Kreij, Gorinchem (NL); Oguzhan Oztoprak, Helmond (NL); Tom Kooyman, Eindhoven (NL)

(73) Assignee: LIGHTYEAR IPCO B.V., Helmond (NL)

( * ) Notice: Subject to any disclaimer, the term of this patent is extended or adjusted under 35 U.S.C. 154(b) by 96 days.

(21) Appl. No.: 18/729,463

(22) PCT Filed: Feb. 3, 2023

(86) PCT No.: PCT/EP2023/052697
§ 371 (c)(1),
(2) Date: Jul. 16, 2024

(87) PCT Pub. No.: WO2023/148337
PCT Pub. Date: Aug. 10, 2023

(65) Prior Publication Data
US 2025/0121692 A1 Apr. 17, 2025

(30) Foreign Application Priority Data
Feb. 3, 2022 (NL) ..................................... 2030816

(51) Int. Cl.
*B60L 3/04* (2006.01)
*B60L 1/00* (2006.01)
(Continued)

(52) U.S. Cl.
CPC .................. *B60L 3/04* (2013.01); *B60L 1/00* (2013.01); *B60L 50/60* (2019.02); *B60L 53/51* (2019.02);
(Continued)

(58) Field of Classification Search
CPC .... B60L 3/04; B60L 1/00; B60L 50/60; B60L 53/51; B60L 58/18; B60L 2240/545;
(Continued)

(56) References Cited

U.S. PATENT DOCUMENTS

| | | | | |
|---|---|---|---|---|
| 9,018,894 | B2 | 4/2015 | Enoki | |
| 10,850,717 | B2 * | 12/2020 | Ito ............................ | B60T 8/17 |

(Continued)

FOREIGN PATENT DOCUMENTS

| | | | |
|---|---|---|---|
| EP | 2774798 | B1 | 4/2020 |

OTHER PUBLICATIONS

Netherlands Search Report and Written Opinion dated Oct. 31, 2022, for Netherlands Patent Application No. 2030816.

(Continued)

*Primary Examiner* — Scott A Browne
*Assistant Examiner* — Shahira Baajour
(74) *Attorney, Agent, or Firm* — Patterson + Sheridan, LLP

(57) ABSTRACT

There is provided a battery management system for an electric vehicle. The battery management system comprises a first load connector, a second load connector, a first switch, a first battery connector, a second battery connector and a control unit. The first load connector is connectable to a first group. The second load connector is connectable to a second group. The first battery connector is connectable to a first battery. The second battery connector connectable to a second battery. The battery management system is adapted to transfer electric energy from the first battery via the first switch to the first group and to the second group. The battery management system is adapted to connect the second battery to the second group. The control unit is configured to receive a signal representative of a dangerous situation for the first battery. The control unit is configured, in response to the (Continued)

Figure 1:
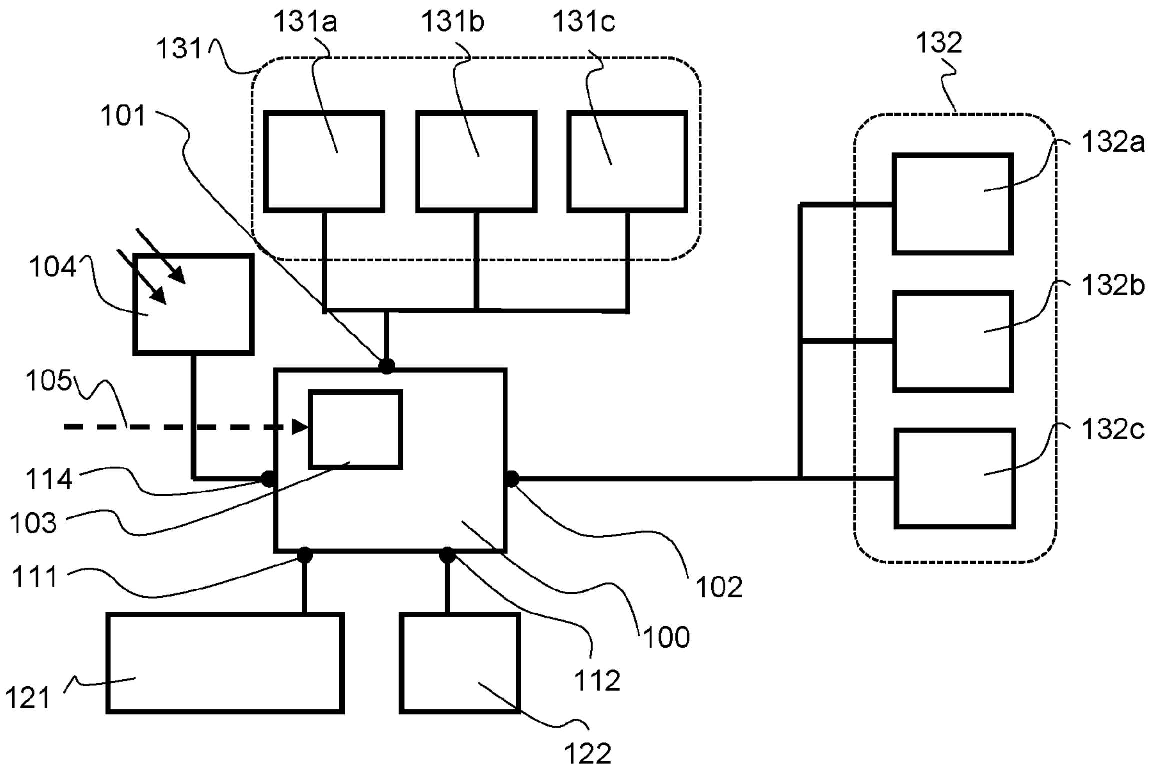

signal, to switch the first switch to disconnect the first battery from the first group and from the second group, and to start transferring electric energy from the second battery to the second group.

26 Claims, 5 Drawing Sheets

(51) Int. Cl.

| | |
|---|---|
| ***B60L 50/60*** | (2019.01) |
| ***B60L 53/51*** | (2019.01) |
| ***B60L 58/18*** | (2019.01) |
| ***B60W 30/09*** | (2012.01) |
| ***H01M 10/0525*** | (2010.01) |
| ***H01M 10/06*** | (2006.01) |
| ***H01M 10/42*** | (2006.01) |
| ***H01M 10/48*** | (2006.01) |

(52) U.S. Cl.
CPC ............ *B60L 58/18* (2019.02); *B60W 30/09* (2013.01); *H01M 10/0525* (2013.01); *H01M 10/06* (2013.01); *H01M 10/425* (2013.01); *H01M 10/482* (2013.01); *H01M 10/486* (2013.01); *B60L 2240/545* (2013.01); *B60L 2240/547* (2013.01); *B60W 2710/18* (2013.01); *H01M 2010/4271* (2013.01); *H01M 2220/20* (2013.01)

(58) Field of Classification Search
CPC ............ B60L 2240/547; B60L 3/0092; B60L 3/0046; B60W 30/09; B60W 2710/18; H01M 10/0525; H01M 10/06; H01M 10/425; H01M 10/482; H01M 10/486; H01M 2010/4271; H01M 2220/20; Y02T 10/70; B60Y 2200/91
See application file for complete search history.

(56) References Cited

U.S. PATENT DOCUMENTS

| | | | | |
|---|---|---|---|---|
| 2017/0036622 | A1 | 2/2017 | Horn et al. | |
| 2017/0197567 | A1 | 7/2017 | Iwasaki et al. | |
| 2018/0354436 | A1 | 12/2018 | Sato | |
| 2021/0229642 | A1* | 7/2021 | Komori .................. | B60T 8/241 |

OTHER PUBLICATIONS

PCT International Search Report and Written Opinion dated Apr. 11, 2023, for International Application No. PCT/EP2023/052697.

* cited by examiner

BATTERY MANAGEMENT SYSTEM, ELECTRIC VEHICLE, METHOD AND CONTROL UNIT

The invention relates to a battery management system for an electric vehicle. The invention further relates to an electric vehicle comprising the battery management system. The invention further relates to a method for transferring electric energy. Further, the invention relates to a control unit for use in the battery management system.

Electric vehicles, such as electric cars, have a battery to store electric energy. The electric vehicle has various loads that consume the electric energy. A load is a device or a system of the electric vehicle that requires electric energy to operate. The larger the electric capacity of the battery is, the longer the loads can be operated without the need for recharging the battery. However, the larger the electric capacity of the battery, the larger and heavier the battery is. Therefore, the selection for a certain electric capacity for an electric vehicle is a tradeoff based on the desired electric capacity, the available volume in the electric vehicle and the mass of the battery.

Some types of batteries have a higher electric capacity per unit of volume and per unit of mass than other types of batteries. For example, lead acid batteries have been commonly used in the automotive industry for many decades. A lead acid battery typically has a specific energy value of about 30 Wh/kg (Watt-hour per kilogram) and an energy density of about 70 Wh/L (Watt-hour per liter). A newer type of battery is the lithium based battery, such as the lithium-ion battery. The lithium based battery is a rechargeable battery which has a specific energy value of about 135 Wh/kg and an energy density of about 195 Wh/L. So a lithium based battery has an electrical capacity of about 4.5 times that of a lead acid battery with the same weight. A lithium based battery has an electrical capacity of about 2.8 times that of a lead acid battery with the same volume.

Because of the improved electrical capacity, many electric vehicles are provided with a lithium based battery. However, the lithium based battery suffers from the disadvantage that the lithium based battery may cause fire or may produce poisonous gasses in case of damage or an electrical failure. Therefore, safety regulations require that the electric vehicle has a safety system that is able to disconnect the lithium based battery. By timely disconnecting the lithium based battery, fire or poisonous gas may be prevented. To ensure that the electric vehicle is able to be operated for a sufficient amount of time after the lithium based battery is disconnected, the electric vehicle is provided with a lead acid battery. Because the lead acid battery is inherently safe, the lead acid battery is able to provide the electric energy when the lithium based battery is disconnected. However, because both a lithium based battery and a lead acid battery are required to provide energy to operate the vehicle, a large volume and a large mass are needed for the energy storage.

It is an objective of the invention to provide a battery management system for an electric vehicle that is less affected by the disadvantage mentioned above, or to provide at least an alternative battery management system.

The objective of the invention is achieved by a battery management system for an electric vehicle. The battery management system comprises a first load connector, a second load connector, a first switch, a first battery connector, a second battery connector and a control unit. The first load connector is connectable to a first group of at least a first load. The second load connector is connectable to a second group of at least a second load. The second group is different from the first group. The first battery connector is connectable to a first battery. The second battery connector connectable to a second battery. The battery management system is adapted to transfer electric energy from the first battery via the first switch to the first group and to the second group. The battery management system is adapted to connect the second battery to the second group. The control unit is configured to receive a signal representative of a dangerous situation for the first battery. Within the meaning of the present invention, a dangerous situation for the first battery can refer to a surrounding of the battery management system and/or can refer to one or more internal characteristics associated with the first battery. The a dangerous situation associated with the surrounding of the battery management system is for example an emergency situation occurring external to the battery management system. An example when the dangerous situation is associated with the surrounding of the battery management system is that the vehicle is in a collision, accident or crash. Alternatively, the dangerous situation is associated with one or more internal characteristics associated with the first battery. The one or more internal characteristics associated with the first battery are for example the temperature, voltage or state of charge (SOC) of the first battery. For example, the dangerous situation can occur when the temperature of the first battery becomes unacceptably high. The control unit is configured, in response to the signal, to switch the first switch to disconnect the first battery from the first group and from the second group, and to start transferring electric energy from the second battery to the second group.

In case there is no dangerous situation for the first battery, the battery management system transfers electric energy from the first battery to the first group and to the second group of the vehicle. This way, the vehicle is operated in a normal mode. In case a dangerous situation for the first battery occurs, the control unit receives the signal. In response to the signal, the control unit switches the first switch. By switching the first switch, the first battery is disconnected from the first group and the second group, preventing the first battery from transferring energy to the first group and the second group. By disconnecting the first battery from the first group and the second group, the risk of the first battery producing fire or poisonous gasses is reduced or removed completely. By starting to transfer electric energy from the second battery to the second group, some loads of the electric vehicle are provided with electric energy from the second battery. The loads in the second group are selected as loads that are important to remain operational in a safety mode, whereas the loads in the first group are allowed to stop in the safety mode. As a result of providing electric energy to the second group, but not to the first group, the electric capacity of the second battery may be smaller than the electric capacity of the first battery, while still providing the second group with electric energy for a sufficient amount of time. This way, the battery management system creates a safe situation in case the first battery is in danger, without the need for a large volume or large mass of the energy storage.

The battery management system comprises for example a single circuit or is a combination of a plurality of circuits that are interacting together. For example, the battery management system comprises a DC-circuit, an AC-circuit or a combination of a DC-circuit and an AC-circuit. The battery management system comprises, for example, various electric components such as circuit breakers, converters, resistors, capacitors, inductors. The battery management system comprises, for example, electric wires to transfer electric energy. For example, the battery management system is adapted to use the body of the electric vehicle to conduct an electric current.

The electric vehicle is, for example, a car or a truck or a bus. For example, the electric vehicle is a bicycle or a motorbike. For example, the electric vehicle is an aircraft or a watercraft, such as a boat.

The first load connector is a connector that is suitable to connect to at least one load of the first group. For example, the first load connector is a single connector to connect to a single wire of the first group. The single wire of the first group is for example split into multiple wires, each one to a different load in the first group. For example, the first load connector comprises a plurality of connectors to connect to multiple loads of the first group in parallel. The first load connector comprises, for example, a detachable connector such as a plug or a jack or a screw terminal or a blade connector. The first load connector is, for example, adapted to permanently connect to the first group, such as by welding or gluing or soldering.

The second load connector is a connector that is suitable to connect to at least one load of the second group. For example, the second load connector is a single connector to connect to a single wire of the second group. The single wire of the second group is for example split into multiple wires, each one to a different load in the second group. For example, the second load connector comprises a plurality of connectors to connect to multiple loads of the second group in parallel. The second load connector comprises, for example, a detachable connector such as a plug or a jack or a screw terminal or a blade connector. The second load connector is, for example, adapted to permanently connect to the second group, such as by welding or gluing or soldering. The first load connector and the second load connector comprise, for example, the same type of connector or different types of connectors.

The first group has at least a first load. The first group has only one load or has a plurality of loads. The first group has the loads that are used in the normal mode, but not in the safety mode. For example, a load from the first group relates to comfort to people in a cabin of the vehicle. For example, the first group comprises a seat heater and/or a motor to adjust the seat. For example, the first group comprises a power outlet in the cabin. For example, the first group comprises a radio for listening to music. It may be inconvenient that the loads in the first group are not functioning in the safety mode. However, this does not or does not likely lead to an unsafe situation.

The second group has at least a second load. The second group has only one load or has a plurality of loads. The loads in the second group are different from the groups in the first load. There are no loads that are both in the first group and in the second group. The second group has the loads that are used in the normal mode, and that are also used in the safety mode. For example, the loads in the second group are directly related to driving the vehicle. For example, the second group comprises a system for controlling the steering of the vehicle, and/or a system for controlling the braking of the vehicle. This way, the driver of the vehicle is able to safely drive and stop the vehicle at a suitable location in the safety mode. For example, the second group comprises a lighting system for providing light. The lighting system comprises, for example, at least a front headlight. The front headlight illuminates the way in front of the vehicle, allowing the driver to safely drive the vehicle to a suitable location in the safety mode, especially during nighttime. The lighting system comprises, for example, lights arranged to indicate an outline of the vehicle. This allows other traffic to clearly see the electric vehicle in case the vehicle is parked in the safety mode. The lighting system comprises, for example, hazard lights or hazard indicators for notifying other traffic to be cautious because the electric vehicle has a malfunction.

The first battery connector is any connector that is suitable to be connected to the first battery. For example, the first battery connector comprises two terminals, each one to be connected to a pole of the first battery. For example, the first battery connector comprises a SAE Post type connector or a JIS type connector or a L-terminal. The first battery connector comprises, for example, one or more threaded posts.

The second battery connector is any connector that is suitable to be connected to the second battery. For example, the second battery connector comprises two terminals, each one to be connected to a pole of the second battery. For example, the second battery connector comprises a SAE Post type connector or a JIS type connector or a L-terminal. The second battery connector comprises, for example, one or more threaded posts.

The battery management system is adapted to connect the first battery via the first battery connector to the first switch, and from the first switch via the first load connector to the first group. The battery management system is adapted to connect the first battery via the first battery connector to the first switch, and from the first switch via the second load connector to the second group. The battery management system is adapted to connect the second battery via the second battery connector to the second load connector, and via the second load connector to the second group.

The first switch is able to connect the first battery to the first group and the second group in the normal mode, and is able to disconnect the first battery from the first group and from the second group in the safety mode. The first switch is a single switch or is formed by a plurality of switches. For example, the first switch comprises one or more switches to connect the first battery to all loads of the first group. For example, the first switch comprises one or more switches to connect the first battery to all loads of the second group. For example, the first switch comprises a relay switch. For example, the first switch comprises a transistor. For example, the first switch comprises a DC contactor or an electronic switch such as a MOSFET.

The first battery is for example a lithium based battery. For example, the first battery has a large electric capacity that is able to provide the loads in the first group and the second group for a long period of time, such as at least for one or more hours. The first battery is a single battery or is formed by a plurality of batteries that are connected to each other. The plurality of batteries are, for example, connected to each other in series or parallel to each other. In an example, first battery has some batteries that are arranged in series, and has some batteries that are arranged in parallel to each other. The first battery is, for example, a rechargeable battery.

The second battery is, for example, a battery that is safer than the first battery. The second battery is, for example, a lead acid battery. The second battery is, for example, a LTO battery or a solid state battery or a super capacitor. For example, the second battery has a small electric capacity that is able to provide the loads in the second group for a short period of time, such as a few minutes or half an hour. For example, the second battery has an electric capacity that is able to provide the loads in the second group for a long period of time, such as many minutes or hours. To obtain the long period of time, for example, only a few loads are present in the second group and/or the loads in the second group require only little electric power. The second battery is a single battery or is formed by a plurality of batteries that are connected to each other. The plurality of batteries are, for example, connected to each other in series or parallel to each other. In an example, second battery has some batteries that are arranged in series, and has some batteries that are arranged in parallel to each other. The second battery is, for example, a rechargeable battery.

In an embodiment, the second battery is the same type of battery as the first battery. For example, both the first battery and the second battery are a lithium based battery. In case a dangerous situation for one of the lithium based batteries occurs, the other lithium battery takes over. For example, one of the lithium based batteries has a dangerously high temperature, whereas the other battery has an acceptable temperature. Safety regulations may require that the second battery is connected to the second group via a switch similar to the first switch. It may be possible in this embodiment that both lithium based batteries need to be disconnected from the second group at the same time. This may happen if a dangerous situation occurs for both lithium based batteries. However, depending on the application, the risk that this occurs may be acceptably low. This risk may be acceptable, for example, when the electric vehicle is designed to operate at a low speed, such as less than 25 km/hour or less than 10 km/hour, or when the electric vehicle is only operated in a non-public environment, such as on a factory site.

The control unit receives the signal which is representative of a dangerous situation for the first battery. The signal is, for example, provided by a sensor. The sensor is adapted to provide the signal representative of the dangerous situation for the first battery. For example, the sensor is a temperature sensor for sensing a temperature of the first battery. In a situation in which the temperature exceeds a threshold, the first battery may be damaged. When the temperature exceeds a threshold, the sensor provides the signal. For example, the sensor is an electric current sensor sensing an electric current through the first battery. In a situation in which the electric current exceeds a maximum value, the first battery may be damaged.

When the electric current exceeds a maximum value, the sensor provides the signal. For example, the sensor is an acceleration sensor for sensing an acceleration of the electric vehicle. In a situation in which the vehicle is in a collision, the vehicle undergoes an acceleration. For example, the acceleration is larger than a maximum deceleration that the brakes are able to provide. For example, the acceleration is in a direction different from a movement direction of the vehicle. For example, the vehicle accelerates without using the brakes and/or a propulsion unit to achieve that acceleration. In a collision, the first battery may get damaged. The sensor determines that a collision has taken place based on the acceleration of the electric vehicle, and provides the signal accordingly. Another dangerous situation is, for example, that the electric vehicle is an electric car which accidentally gets into water, like in a pond or river. For example, the sensor is adapted to provide the signal when the electric vehicle is in water. In this situation, people in the vehicle may be electrocuted by the first battery via the water. To improve the safety, the control unit disconnects the first battery.

In an example, the signal is provided by a safety switch. When, for example, the operator of the vehicle sees a dangerous situation, the operator presses the safety switch. In response, the safety switch provides the signal. For example, the safety switch is a kill switch. In an example, the safety switch is a dead man's switch. The dead man's switch provides the signal in case the operator of the vehicle leaves the vehicle or becomes incapacitated.

The control unit receives the signal. For example, the control unit has a terminal to receive the signal from the sensor or from the safety switch. For example, the control unit receives the signal via a wire. For example, the control unit receives the signal via wireless communication. The control unit receives, for example, a single signal from a single sensor. In another example, the control unit receives signals from multiple sensors. For example, the control unit performs signal processing to determine whether to switch the first switch or not. For example, the control unit may only open the first switch when the sensor provides the signal for a certain amount of time. For example, the control unit is configured to open the first switch based on one or more other parameters of the vehicle. The control unit, comprises, for example, a microprocessor. For example, the control unit comprises a memory for storing software.

The control unit is configured to switch the first switch to disconnect the first battery, for example, by providing a control signal to the first switch. In response to the control signal, the first switch switches and disconnects the first battery from the first group and from the second group.

The control unit is configured to start transferring electric energy from the second battery to the second group. For example, the control unit is configured to switch a switch between the second battery and the second group to connect the second battery and the second group to each other. For example, the control unit causes the second battery to transfer the electric energy to the second group by stopping the transfer of energy from the first battery to the second group. By stopping the transfer of energy from the first battery, the voltage on the second group caused by the first battery goes down. This causes the voltage of the second battery to generate a current to the second group. As a result, electric energy is transferred from the second battery to the second group. In another example, the control unit is configured to control the second battery to start transferring electric energy.

In an embodiment, the control unit is adapted to receive the signal while the battery management system transfers electric energy from the first battery to the first group and to the second group.

According to this embodiment, the first battery is in the process of providing electric energy to the first group and the second group, when the control unit receives the signal. For example, the electric vehicle is in motion and the first battery is transferring electric energy to the loads of the first group and the second group. While the electric vehicle is in motion, a dangerous situation for the first battery occurs. The control unit receives the signal representative of the dangerous situation. Then, the control unit disconnects the first battery from the first group and the second group. The second battery provides electric energy to the second group, to allow the loads in the second group to help stopping the vehicle safely.

In an embodiment, the control unit is configured to start transferring electric energy from the second battery to the second group only, in response to the signal.

According to this embodiment, the second battery starts to transfer electric energy and directs that electric energy only to the second group, and not to any load outside the second group. The second group does not receive any electric energy from any battery other than the second battery in the safety mode.

In an embodiment, the battery management system comprises a charge controller connectable to the second battery.

The charge controller is configured to maintain the second battery at a fully charged state at least while the battery management system transfers electric energy from the first battery to the first group and to the second group.

According to this embodiment, the charge controller maintains the second battery at a fully charged state, to ensure the electric vehicle is able to maintain operational in the safety mode as long as possible. When the vehicle is operated in the normal mode, the battery management system transfers electric energy from the first battery to the first group and to the second group. At least during the normal mode, the charge controller keeps the second battery fully charged. Optionally, the charge controller also maintains the second battery at a fully charged state when the vehicle is not in the normal mode. For example, the charge controller also maintains the second battery at a fully charged state when the vehicle is not operated, such as when parked or when charging the batteries. For example, the charge controller is adapted to receive electric energy from the first battery to maintain the second battery at a fully charged state. For example, the charge controller is not able to maintain the second battery at the fully charged state in the safety mode.

In an embodiment, the battery management system comprises a first electric component and a second electric component. The battery management system is adapted to connect the first group and the second group to each other via the first electric component. The battery management system is adapted to connect the second battery to the second group via the second electric component. The first electric component is adapted to block a transfer of electric energy from the second battery to the first group. The second electric component is adapted to block a transfer of electric energy from the first battery to the second battery.

According to this embodiment, the first group and the second group are electrically connected to each other via the first electric component. For example, during the normal mode, electric energy from the first battery is transferred to the second group via the first electric component in parallel to the first group via a part of the first group. The first electric component allows the electric current to pass to transfer the electric energy from the first battery to the second group. However, the first electric component blocks any electric current from passing that would transfer electric energy from the second group to the first group or from the second battery to the first group. This prevents a problem in the safety mode, because it is prevented that loads in the first group receive electric energy from the second battery.

The second electric component blocks the transfer of energy from the first battery to the second battery. This prevents that the second battery is recharged during the normal mode in an uncontrolled way. Many battery types have an improved lifetime if uncontrolled recharging is prevented. The second electric component helps the second battery to conserve electric energy in the normal mode. This way, the electric energy of the second battery is conserved for the safety mode.

In an embodiment, at least one of the first electric component and the second electric component comprises a diode.

According to this embodiment, the first electric component comprises a diode, the second electric component comprises a diode, or each of the first electric component and the second electric component comprise a diode. In case the first electric component comprises the diode, the diode is arranged to block a current from flowing from the second group to the first group, while allowing a current to flow from the first group to the second group. In case the first electric component comprises the diode, the diode is arranged to block a current from flowing from the second battery to the first group. In case the second electric component comprises the diode, the diode is arranged to block a current from flowing from the first battery to the second battery, while allowing a current to flow from the second battery to the second group. In this case, the voltage of the second battery is, for example, a little lower than the voltage of the first battery. The voltage of the second battery is high enough to apply sufficient voltage to the second group in the safety mode. For example, the voltage of the second battery is 0.1 V or 0.2 V or 1 V lower than the voltage of the first battery. This small difference in voltage causes the diode of the second electric component to block any electric current from the second battery to the second group in the normal mode, while allowing an electric current to pass from the second battery to the second group in the safety mode.

In an embodiment, at least one of the first electric component and the second electric component comprises a further switch. The control unit is configured to operate the further switch in response to the signal.

According to this embodiment, the first electric component comprises the further switch, the second electric component comprises the further switch, or each of the first electric component and the second electric component comprises a further switch. In case the first electric component comprises the further switch, the further switch is set to connect the first group and the second group to each other by the control unit in the normal mode. When the control unit receives the signal, the control unit switches the further switch to disconnect the first group and the second group from each other. In case the second electric component comprises the further switch, the further switch is set by the control unit to disconnect the second battery and the second group from each other in the normal mode. When the control unit receives the signal, the control unit switches the further switch to connect the second battery and the second group to each other.

In an embodiment, there is provided an electric vehicle comprising the battery management system according to any of the embodiments disclosed above, the first group, the second group, the first battery, the second battery, and a sensor adapted to provide the signal representative of a dangerous situation for the first battery.

In an embodiment, the second battery has a smaller energy capacity than the first battery.

According to this embodiment, the second battery may have a small weight and/or volume, because the energy capacity of the second battery is smaller than the energy capacity of the first battery. For example, the energy capacity of the first battery is more than 400 Wh, or more than 1000 Wh or more than 2000 Wh or more than 3000 Wh. For example, the energy capacity of the second battery is less than 300 Wh, or less than 200 Wh or less than 100 Wh. Because the second battery only needs to provide electric energy to the second group, but not to the first group, the small capacity of the second battery is sufficient to provide electric energy to the second group for a sufficiently long time. As a result, the second battery is provided with a reduced weight and a reduced volume.

In an embodiment, the first battery comprises a lithium-ion battery. The second battery comprises a lead-acid battery.

According to this embodiment, the first battery comprises a lithium-ion battery that has a very high energy capacity per unit of mass and per unit of volume. In the normal mode, the large lithium-ion battery is used to provide electric energy to the loads in the first group and the second group for a long time between recharging. In the safety mode, the lead-acid battery provides a safe energy source for the loads in the second group. Because the lead-acid battery does not need to provide electric energy to the first group, a small sized lead-acid battery is sufficient. For a small sized lead-acid battery, it is acceptable that the lead-acid battery has less energy capacity per unit of mass and per unit of volume than the lithium-ion battery.

In an embodiment, the sensor is adapted to provide the signal based on a temperature and/or a voltage of the first battery.

According to this embodiment, a dangerous situation for the first battery occurs in case the temperature of the first battery exceeds a certain threshold, or in case a voltage of the first battery exceeds a certain threshold. Especially lithium-ion batteries are sensitive to high temperatures and over-voltage. By adapting the sensor to provide the signal based on the temperature or the voltage, an important dangerous situation can be detected. When the sensor detects the dangerous situation and provides the signal, the control unit responses accordingly.

In an embodiment, the electric vehicle comprises an electric propulsion system to propel the electric vehicle, and a third battery connected to the electric propulsion system via the battery management system to provide electric energy to the electric propulsion system. A voltage of the third battery is higher than a voltage of the first battery and a voltage of the second battery.

According to this embodiment, the electric vehicle is propelled by an electric propulsion system, such as an electric motor or an electric turbine or an electric propeller. For example, the electric motor is a motor for driving a wheel, such as an inwheel motor or a hub-motor. Because the electric propulsion system is able to convert a large amount of electric energy into kinetic energy, the third battery provides the electric energy to the propulsion system at a high voltage, such as more than 200 V or more than 300 V or more than 400 V. The electric propulsion system is not a load in the first group or the second group. The loads in the first group and the second group convert, in this embodiment, less electric energy compared to the propulsion system. To improve the safety and efficiency of the vehicle, the voltage of the first battery and the second battery is a low voltage, such as less than 50 V, for example 48 V or 24 V or 12 V. In an example, the propulsion system is adapted to remain operational in the safety mode. In another example, the propulsion system is adapted not to remain operational in the safety mode.

In an embodiment, the battery management system comprises a second switch. The third battery is connected to the electric propulsion system via the second switch to provide electric energy to the electric propulsion system. The control unit is configured to switch the second switch to disconnect the third battery from the electric propulsion system to stop the third battery transferring electric energy to the electric propulsion system, in response to the signal.

According to this embodiment, the third battery is connected to the electric propulsion system via the second switch. In case there is a dangerous situation for the first battery, the control unit receives the signal. The dangerous situation for the first battery may also be a dangerous situation relating to the third battery. Therefore, in response to receiving the signal, the control unit switches the second switch to disconnect the third battery from the electric propulsion system. This helps to create a safer situation in case of a collision. In case of a collision, the electric propulsion system may become damaged. By disconnecting the third battery from the electric propulsion system, the risk of a short circuit in the damaged electric propulsion system is reduced. Also, the risk of electrocution via the damaged electric propulsion system is reduced or eliminated.

Alternatively, the third battery remains connected in the safety mode. For example, the battery management system is arranged to transfer electric energy from the third battery to the second group in the safety mode. For example, a power converter is part of the second group to allow electric energy from the third battery to be converted and transferred to the second group in the safety mode.

In an embodiment, the second group comprises a safety system of the vehicle.

According to this embodiment, the second group comprises one or more systems that relate to safety. It is possible that the electric vehicle is in motion when the control unit receives the signal representative of a dangerous situation. Therefore, it is desirable that the electric vehicle can be stopped in a safe way while the second battery provides the electric energy to the second group. Therefore, the second group includes at least one safety system.

The safety system relates, for example to movement of the vehicle. For example, the safety system comprises a steering system, such as power steering, or a braking system for braking the electric vehicle, such as a power braking system, an Anti-lock Braking System (ABS) or a Dynamic Stability Control system (DSC-system).

For example, the safety system comprises a lighting system to provide light. For example, the lighting system provides light in front of the vehicle, allowing the operator of the electric vehicle to guide the electric vehicle to a suitable place to stop in the safety mode, especially at night or during bad weather. For example, the lighting system is adapted to activate hazard indicators to warn other traffic that the electric vehicle has a malfunction. For example, the lighting system is adapted to activate emergency lights inside the vehicle to allow people to easily find their way out of the electric vehicle, especially at night. Such emergency lights are especially beneficial in case the vehicle is a bus or a train or a passenger ship.

For example, the safety system comprises a telecom system for providing telecommunication with an emergency service. For example, the telecom system is configured to send a communication signal to the emergency service when the second battery provides electric energy to the second group. The communication signal includes, for example, information about the current location of the electric vehicle, such as GPS-coordinates. The emergency service is, for example, a service to request the aid of the police, the fire brigade or medical service. The emergency service is, for example, a service of the manufacturer or a dealer of the electric vehicle. The telecom system is, for example, a one-way system that is adapted to only send communication signals. The telecom system is, for example, a two-way system that is adapted to send and receive communication signals. For example, the two-way system is a telephone system or a chat message system or a video-conference system or a two-way radio system.

For example, the safety system comprises an unlocking system for unlocking a door and/or a window of the vehicle. Many vehicle, especially cars, have a central locking system for locking the doors of the vehicle. For example, the central locking system automatically locks the doors when the vehicle drives off. However, the central locking system requires electric energy to unlock the doors. Therefore, in the safety mode, the second battery provides electric energy to the unlocking system to unlock the doors. In addition or alternatively, the unlocking system unlocks one or more windows of the vehicle. For example, the unlocking system opens one or more windows. By including the unlocking system in the second group, people in the vehicle are able to exit the vehicle safely in the safety mode.

In an embodiment, the safety system comprises at least one of a lighting system for providing light, a telecom system for providing telecommunication with an emergency service, an unlocking system for unlocking a door and/or a window of the vehicle, and a braking system for braking the vehicle.

In an embodiment, the first group comprises at least one of a HVAC-system adapted to provide heating, ventilation and/or air condition of the vehicle, a seat heater arranged to provide heating of a seat in the vehicle, and an entertainment system for providing audio or video.

According to this embodiment, the first group includes systems that provide comfort to people in the vehicle. However, such systems may require a large amount of electric power. By arranging these systems in the first group, the second battery is able to provide electric energy to the second group for a longer amount of time.

The HVAC-system comprises, for example, a heater to provide a heated air flow to a cabin in the electric vehicle. The HVAC-system comprises, for example, a fan to provide an air flow of fresh air from outside the vehicle into the cabin. The HVAC-system comprises, for example, an air condition system to remove heat from the cabin. Although it may be inconvenient for the people in the cabin of the vehicle that the HVAC-system is not in operation in the safety mode, this does not likely result in an unsafe situation. In an example, the HVAC-system has some loads that receive electric energy from the first battery, whereas the HVAC-system has other loads that receive electric energy from the third battery. For example, the HVAC-system comprises a climate system that receives electric energy from the first battery. In the safety mode, the first switch disconnects the first battery from the loads of HVAC-system that are connected to the first battery in the normal mode.

The seat heater provides heating of a seat in the normal mode. This provides comfort to the person in the seat, especially when the seat has a leather cover. However, because the seat heater does not contribute to safety, the seat heater is arranged in the first group.

The entertainment system provides audio, such as music, or video, such as movies. Because the entertainment system does not contribute to safety, the entertainment system is arranged in the first group.

In an embodiment, the electric vehicle comprises an airbag system. The sensor is adapted to provide the signal based on an activation of the airbag system.

According to this embodiment, the control unit receives the signal when the airbag system is activated. The airbag system is an example of a safety system. Because the airbag system is typically activated in case of a collision, the activation is representative of a dangerous situation for the first battery. The sensor, for example, is configured to perform a measurement whether the airbag system is activated. For example, the sensor is part of the ai bag system. For example, the sensor is configured to generate an activation signal to activate the airbag system in case of a collision. The sensor sends the activation signal to an actuator in the airbag system. The sensor also sends the activation signal to the control unit as the signal representative of a dangerous situation for the first battery.

In an embodiment, the electric vehicle comprises an autonomous emergency braking system for autonomously braking of the vehicle in an emergency. The sensor is adapted to provide the signal based on an activation of the autonomous emergency braking system.

According to this embodiment, the autonomous emergency braking system is a system that is adapted to predict whether the electric vehicle is likely to collide. When detecting that a collision is likely, the autonomous emergency braking system activates the brakes in an attempt to avoid a collision or to reduce the impact of a collision. Because the autonomous emergency braking system is activated in the event of a likely collision, a dangerous situation for the first battery occurs. Therefore, the sensor provides the signal based on the activation of the autonomous emergency braking system. For example, the sensor is configured to measure whether the autonomous emergency braking system is activated. For example, the sensor is part of the autonomous emergency braking system. For example, the sensor is configured to generate an activation signal to activate the autonomous emergency braking system in case of a likely collision. The sensor sends the activation signal to an actuator in the braking system. The sensor also sends the activation signal to the control unit as the signal representative of a dangerous situation for the first battery.

In an embodiment, the electric vehicle comprises a solar panel for generating electric energy based on solar energy. The solar panel is connected to the first battery via the first switch to transfer electric energy to the first battery. The control unit is configured, in response to the signal, to switch the first switch to disconnect the solar panel from the first battery.

According to this embodiment, the solar panel provides electric energy to the first battery in the normal mode. In the safety mode, the first battery is disconnected from the solar panel. This helps to prevent an over-voltage of the first battery.

In an embodiment, the electric vehicle comprises a connector for connecting the first battery to an external electric power supply. The connector is arranged to transfer electric energy from the external electric power supply to the first battery. The control unit is configured, in response to the signal, to disconnect the first battery from the external electric power supply.

According to this embodiment, the electric vehicle is chargeable by connecting the electric vehicle via the connector to an external electric power supply. The external electric power supply is, for example, the power grid, or a charging station or an electric generator or an external solar panel. The external electric power supply is referred to as 'external', because the external electric power supply does not form part of the electric vehicle. The external electric power supply, for example, does not move with the vehicle. In case the control unit receives the signal while the connector is connected to the external electric power supply, the control unit disconnects the first battery from the external electric power supply. For example, the control unit switches a switch that is arranged in between the first battery and the connector. The connector is adapted to connect the first battery directly to the external electric power supply or indirectly. For example, the connector is adapted to connect the first battery indirectly to the external electric power supply via the third battery and/or via a power converter. In response to the signal, the control unit is, for example, disconnect the third battery from the connector, and/or to disconnect the connector from the power converter, and/or to disconnect the third battery from the first battery.

In a further aspect of the invention, there is provided a method for transferring electric energy, comprising the steps of:

connecting a first battery to a first group and to a second group to allow the first battery to transfer electric energy to the first group and the second group, wherein the first group comprises at least a first load, wherein the second group comprises at least a second load, the second group being different from the first group, receiving a signal representative of a dangerous situation for the first battery, disconnecting the first battery from the first group and the second group after receiving the signal, connecting a second battery to the second group to allow the second battery to transfer electric energy to the second group after receiving the signal.

According to the further aspect of the invention, the first battery is able to provide electric energy to the first group and the second group in case there is no dangerous situation for the first battery. In case a signal is received that there is a dangerous situation for the first battery, the first battery is disconnected from the first group and the second group. This improves the safety relating to the first battery. By connecting the second battery to the second group, the second group remains provided with electric energy. Because the second battery provides the electric energy to the second group, but not to the first group, the second battery is able to provide the electric energy to the second group for a longer time.

In an embodiment, the method comprises the steps of:

transferring electric energy from the first battery to the first group and to the second group, stop transferring electric energy from the first battery to the first group and to the second group after receiving the signal, and start transferring electric energy from the second battery to the second group after receiving the signal.

According to this embodiment, the process of transferring electric energy from the first battery to the first group and the second group is ongoing. After the signal is received, this process is stopped. After the signal is received, the transfer of electric energy from the second battery to the second group is started.

In an embodiment, the step of connecting the second battery to the second group comprises connecting the second battery only to the second group.

According to this embodiment, the second battery is connected only to the second group, but not to any loads outside the second group in the safety mode. The second group does not receive any electric energy from any battery other than the second battery in the safety mode.

In an embodiment, the method comprises the step of maintaining the second battery at a fully charged state while the first battery is transferring electric energy from the first battery to the first group and to the second group.

While maintaining the second battery at the fully charged state, it is ensured that the second battery is able to provide electric energy to the second group in the safety mode as long as possible.

In an embodiment, the step of receiving the signal comprises receiving the signal representative of a temperature and/or a voltage of the first battery.

In yet a further aspect of the invention, there is provided a control unit for use in the battery management system according to any one of the embodiments mentioned above or in the electric vehicle according to any one of the embodiments mentioned above.

Figure 2:
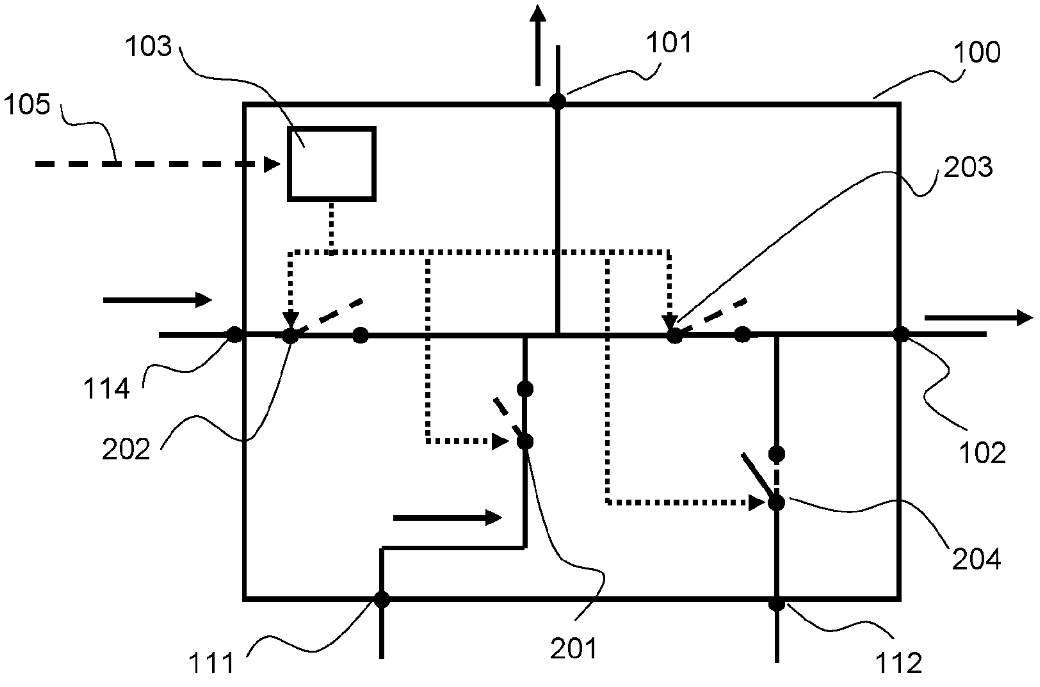
Figure 3:
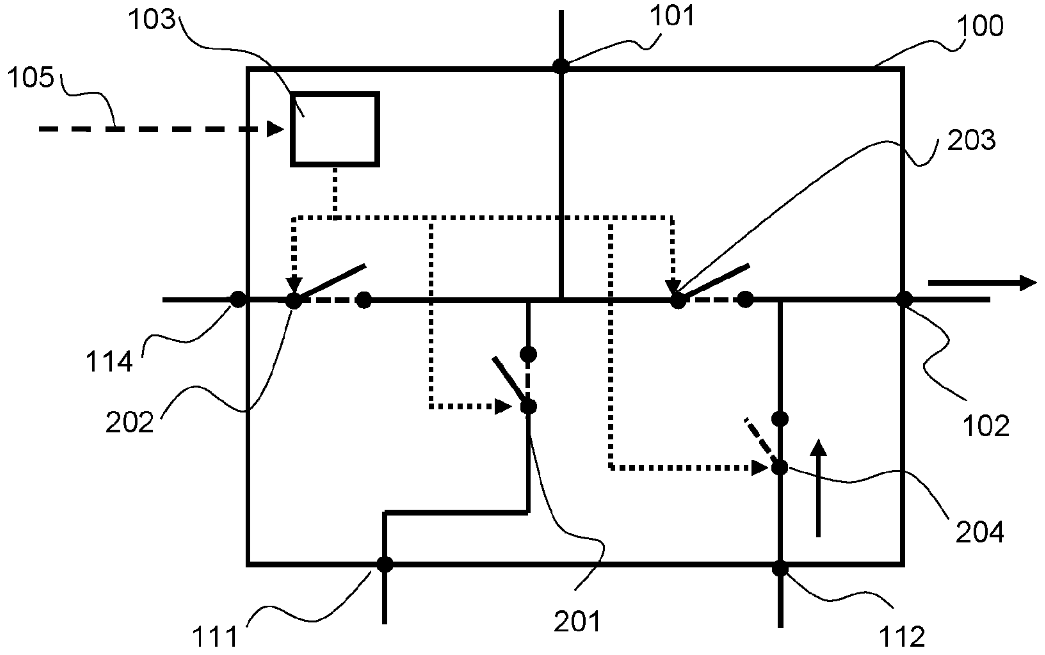
Figure 4:
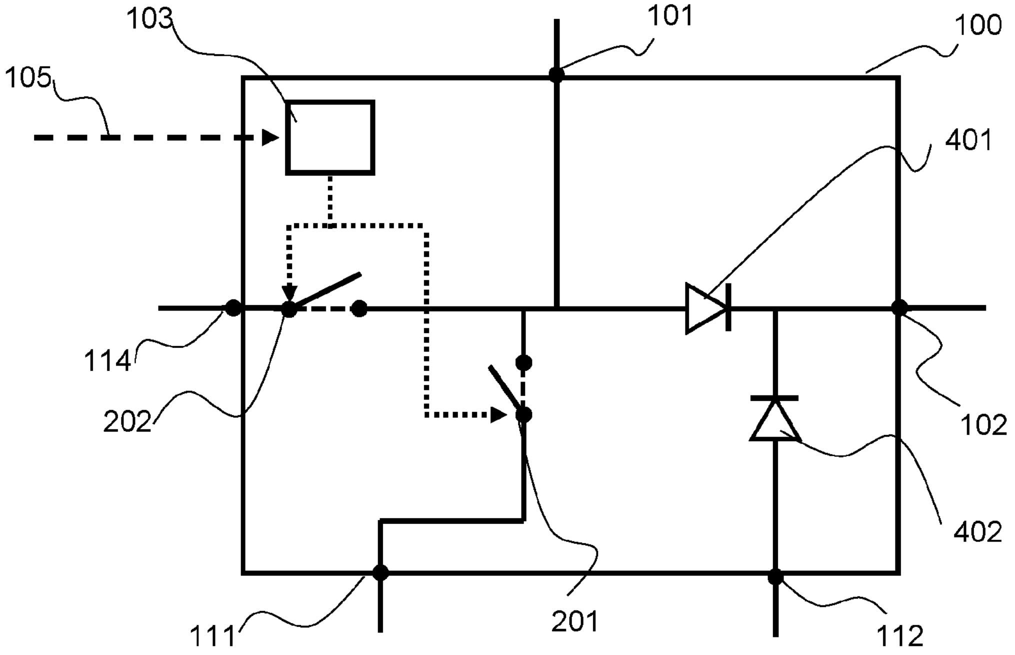
Figure 5:
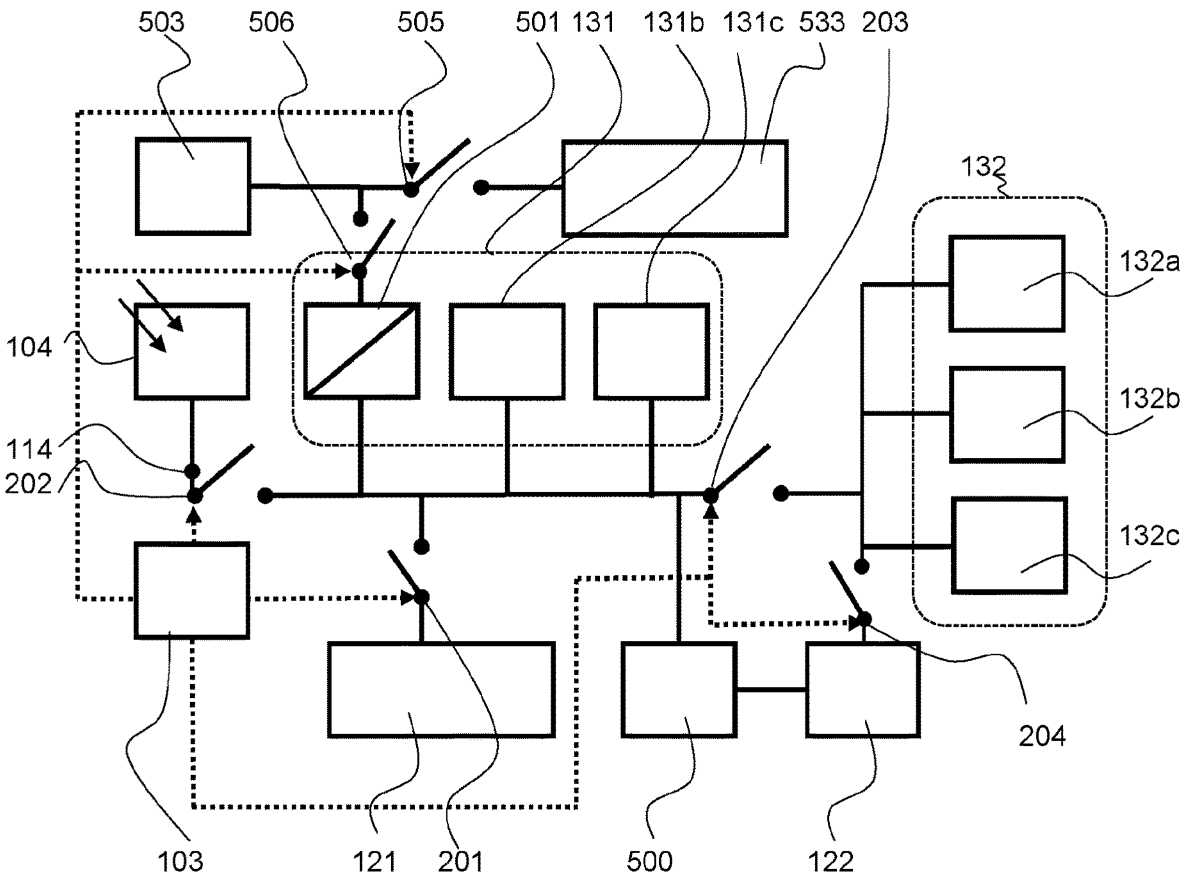
Figure 6:
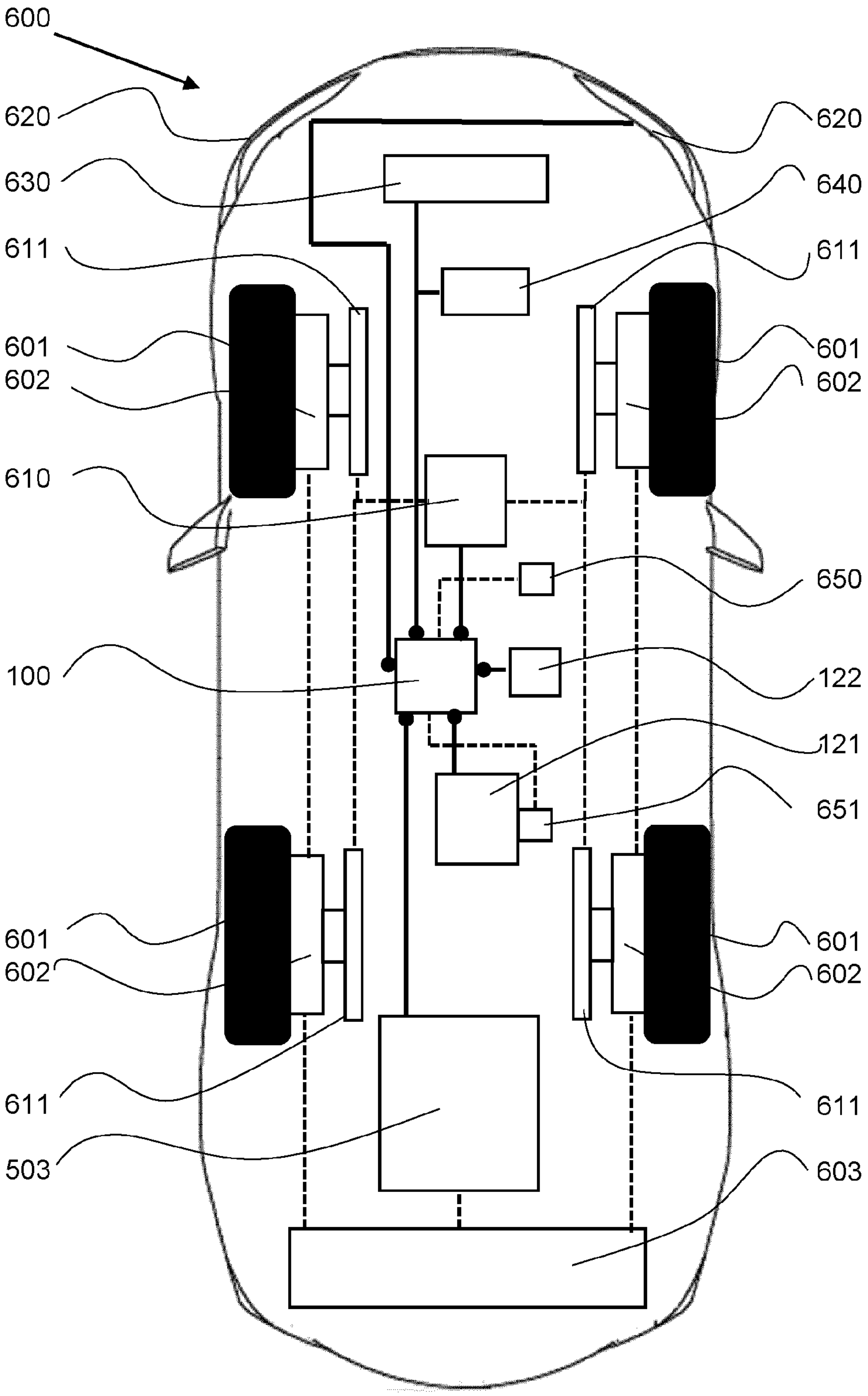

The invention will be described in more detail below under reference to the figures. In the figures exemplary embodiments of the invention will be shown. The figures show in:

FIG. 1: a battery management system according to a first embodiment,

FIG. 2: a detailed view of the battery management system according to the first embodiment in a normal mode, FIG. 3: the detailed view of the battery management system according to the first embodiment in a safety mode, FIG. 4: a battery management system according to a second embodiment, FIG. 5: a battery management system according to a third embodiment FIG. 6: a vehicle according to an embodiment of the invention.

Figure 7:
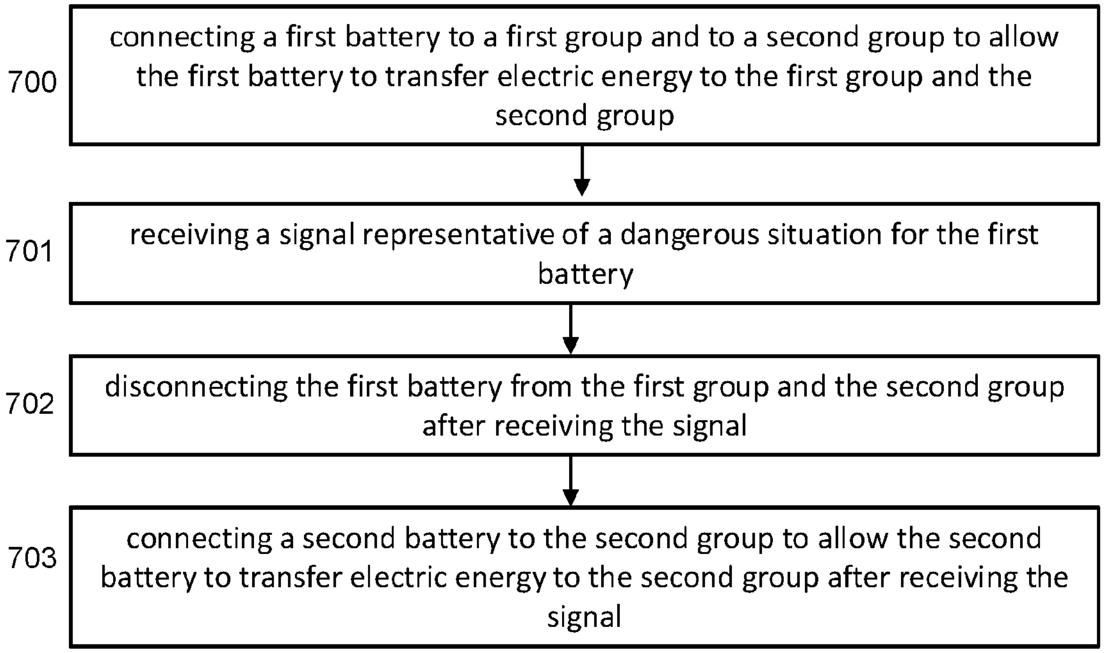

FIG. 7: a method for transferring electric energy according to an embodiment of the invention.

FIGS. 1-3 depict a battery management system 100 for an electric vehicle. The battery management system 100 will be further referred to as BMS 100. The BMS 100 comprises a first load connector 101, a second load connector 102, a first switch 201, a first battery connector 111, a second battery connector 112, and a control unit 103. The first load connector 101 is connectable to a first group 131 of three first loads 131*a*-131*c*. The second load connector 102 is connectable to a second group 132 of three second loads 132*a*-132*c*. In practice, the first group 131 and the second group 132 may comprise many more loads. The second group 132 is different from the first group 131. The first battery connector 111 is connectable to a first battery 121. The second battery connector 112 is connectable to a second battery 122. The BMS 100 is adapted to transfer electric energy from the first battery 121 via the first switch 201 to the first group 131 and to the second group 132. The BMS 100 is adapted to connect the second battery 122 to the second group 132. The control unit 103 is configured to receive a signal 105 representative of a dangerous situation for the first battery 121. The control unit 103 is configured, in response to the signal 105, to switch the first switch 201 to disconnect the first battery 121 from the first group 131 and from the second group 132, and to start transferring electric energy from the second battery 122 to the second group 132.

The BMS 100 comprises a solar connector 114 that is connectable to a solar panel 104. The solar panel 104 is for generating electric energy based on solar energy.

The BMS 100 comprises a second switch 202, a third switch 203 and a fourth switch 204. The second switch 202 connects the solar panel 104 to the first battery 121. The third switch 203 connects the second group 132 to the first battery 121. The fourth switch 204 connects the second battery 122 to the second group 132.

FIG. 2 depicts the first embodiment in a normal mode. In the normal mode, there is no dangerous situation detected for the first battery 121. In the normal mode, the first switch 201 is in the ON-state to connect the first battery 121 via the first switch 201 to the first group 131. The second switch 202 is in the ON-state to connect the solar panel 104 to the first battery 121 and to the first group 131. Solar energy from the solar panel 104 is used to charge the first battery 121 and/or solar panel 104 provides solar energy directly to the first group 131 and the second group 132. The third switch 203 is in the ON-state to connect the first battery 121 via the first switch 201 and the third switch 203 to the second group 132. The third switch 203 is in the ON-state to connect the solar panel 104 via the second switch 202 and the third switch 203 to the second group 132. The fourth switch 204 is in the OFF-state to disconnect the second battery 122 from the first battery 121, the first group 131 and the second group 132. The fourth switch 204 is in the OFF-state to disconnect the second battery 122 from the solar panel 104.

In the normal mode, electric energy is transferred from the first battery 121 to the first group 131, and from the first battery 121 to the second group 132. Electric energy is transferred from the solar panel 104 to the first battery 121 and/or the first and second groups 131/132. The transfer of the electric energy is illustrated with arrows.

FIG. 3 depicts the first embodiment in a safety mode. While the BMS 100 transfers electric energy from the first battery 121 to the first group 131 and to the second group 132 in the normal mode, a dangerous situation is detected for the first battery 121. The control unit 103 receives the signal 105 representative of the dangerous situation. When receiving the signal 105, the control unit 103 switches the first switch 201 in the OFF-state to disconnect the first battery 121 from the first group 131, the second group 132 and the solar panel 104. The control unit 103 switches the second switch 202 in the OFF-state to disconnect the solar panel 104 from the first group 131. The control unit 103 switches the fourth switch 204 in the ON-state to connect the second battery 122 to the second group 132. To prevent that the second battery 122 is connected via the fourth switch 204 to the first group 131, the control unit 103 switches the third switch 203 in the OFF-state.

In the safety mode, electric energy is transferred only from the second battery 122 to the second group 132, as indicated with the arrows. No electric energy is transferred from the first battery 121 or from the solar panel 104 to the first group 131 or the second group 132.

FIG. 4 depicts a BMS 100 according to a second embodiment. The second embodiment has, for example, the same elements as the first embodiment, except for the following.

Instead of the third switch 203 and the fourth switch 204, the second embodiment has two different electric components. The third switch 203 is replaced by a first diode 401. The fourth switch 204 is replaced by a second diode 402. The control unit 103 has fewer outputs for sending control signals than in the first embodiment, because the control signals for the third switch 203 and the fourth switch 204 are omitted.

In the normal mode, the first battery 121 provides electric energy to the first group 131 and the second group 132. The first battery 121 provides an electric current through the second load connector 102 and applies a voltage to the second load connector 102. This voltage is referred to as the first battery voltage. The first diode 401 allows the electric current to pass from the first battery 121 to the second load connector 102. The second diode 402 blocks any electric current from passing towards the second battery 122. The voltage of the second battery 122, further referred to as the second battery voltage, is 0.2 V lower than the first battery voltage. Because the second battery voltage is 0.2 V lower than the first battery voltage, no electric current will flow from the second battery 122 via the second diode 402 to the second load connector 102 in the normal mode.

In the safety mode, the control unit 103 switches the first switch 201 in the OFF-state and switches the second switch 202 in the OFF-state. As a result, the first battery voltage is no longer applied to the second load connector 102. As a result of the second battery voltage, an electric current will flow via the second diode 402. The electric current is blocked by the first diode 401 from flowing towards the first battery 121. The electric current from the second battery 122 flows towards the second load connector 102 to transfer electric energy to the second group 132. The second group 132 is able to operate on the second battery voltage, despite being marginal lower than the first battery voltage.

FIG. 5 depicts a BMS 100 according to a third embodiment of the invention. The third embodiment comprises, for example, the same elements as the first embodiment and/or the same embodiment, except for the following.

The BMS 100 comprises a charge controller 500 that is connectable to the second battery 122. The charge controller 500 is configured to maintain the second battery 122 at a fully charged state at least while the BMS 100 transfers electric energy from the first battery 121 to the first group 131 and to the second group 132. The charge controller 500 receives electric energy from the first battery 121. The charge controller 500 is configured to detect a state of charge of the second battery 122. If, for example as a result of an energy leakage, the second battery 122 loses electrical energy in the normal mode, the charge controller 500 provides electric energy to the second battery 122 to keep the second battery 122 at a fully charged state. By being at the fully charged state, the second battery 122 is able to provide the most electrical energy in the safety mode. For example, the charge controller 500 is one of the loads in the first group 131. In the safety mode, the charge controller 500 is no longer provided with electric power.

In the third embodiment, the BMS 100 is connectable to a third battery 503 and to a third group 533 of at least one load. The third battery 503 is arranged to provide electric energy to the third group 533. The voltage of the third battery 503 is higher than a voltage of the first battery 121 and a voltage of the second battery 122. The voltage of the third battery 503 is referred to as the third battery voltage. One of the loads in the first group 131 comprises a power converter 501. The power converter 501 is connected to the first battery 121 and is connected to the third battery 503. The power converter 501 is adapted to transfer electric energy from the first battery 121 to the third battery 503 and/or vice versa. The power converter 501 is adapted to convert the electric energy from the first battery voltage to the third battery voltage and/or vice versa.

The third battery 503 is connected to the third group 533 via a fifth switch 505. The power converter 501 is connected to the third battery 503 and the third group 533 via a sixth switch 506. The control unit 103 is configured to switch the fifth switch 505 in the OFF-state to disconnect the third battery 503 from the third group 533 in response of the signal 105. This way, no electric energy is provided to the third group 533 in case of a dangerous situation for the first battery 121. The control unit 103 is configured to switch the sixth switch 506 in the OFF-state to disconnect the power converter 501 from the third battery 503, in response to the signal 105. This way, no electric energy is transferred from the third battery 503 via the power converter 501 to the rest of the first group 131 in the dangerous situation for the first battery 121.

FIG. 6 depicts a vehicle 600 according to an embodiment of the invention. The vehicle 600 comprises, for example, one of the embodiments described above, or any combination thereof. The vehicle 600 is schematically depicted in a top view.

The vehicle 600 is an electric car having four wheels 601. Each wheel 601 has an inwheel motor 602 for driving the corresponding wheel 601. Each wheel 601 is provided with a brake 611, for example a disc brake. The vehicle 600 has a braking system 610 for controlling the brakes 611.

The vehicle 600 has several systems that are considered safety systems. The safety systems include the lighting system 620 comprising lights for providing light, and the braking system 610. The safety systems are loads in the second group 132.

The electric vehicle 600 has a HVAC-system 630 adapted to provide heating, ventilation and/or air condition of the vehicle 600. The electric vehicle 600 has an entertainment system 640 for providing audio or video. These systems are schematically depicted in FIG. 6. The HVAC-system 630 and the entertainment system 640 are not considered safety systems and are loads in the first group 131.

The electric vehicle 600 has the first battery 121 and the second battery 122. The second battery 122 has a smaller energy capacity than the first battery 121. The first battery 121 comprises a lithium-ion battery. The second battery 122 comprises a lead-acid battery. The first battery 121 and the second battery 122 are at a low voltage, less than 50 V.

The electric vehicle 600 comprises the third battery 503 and an electric propulsion system. The electric propulsion system comprises the inwheel motors 602 and an inverter 603. The inverter 603 receives electric energy from the third battery 503, inverts the electric energy and provides the inverted electric energy to the inwheel motors 602. The inwheel motors 602 convert the inverted electric energy into motion to propel the electric vehicle 600. The third battery 503 has a large capacity to store electric energy. The third battery 503 is at a voltage of more than 100 V, for example 400 V. The third battery 503 is at a higher voltage than the voltages of the first battery 121 and the second battery 122.

The electric vehicle 600 comprises two sensors. A temperature sensor 651 is provided to sense a temperature of the first battery 121. The electric vehicle 600 comprises an airbag system, which is not shown in the figures. The electric vehicle 600 comprises an airbag sensor 650 that is adapted to sense an activation of the airbag.

In case the temperature of the first battery 121 exceeds a threshold, a dangerous situation for the first battery 121 occurs. The signal from the temperature sensor 651 is representative of the temperature that exceeds the threshold. The signal indicates the dangerous situation. In case the airbag sensor 650 senses that the airbag system is activated, it is assumed the vehicle 600 is in a collision. A collision is a dangerous situation for the first battery 121. The signal from the airbag sensor 650 representative of the activation of the airbag indicates the dangerous situation.

In the normal mode, the first switch 201 is in the ON-state to connect the first battery 121 to the braking system 610, the lighting system 620, the HVAC-system 630 and the entertainment system 640. The fifth switch 505 is in the ON-state to connect the third battery 503 to the inverter 603 to provide electric energy to the inwheel motors 602.

In case the control unit 103 receives the signal 105 from the temperature sensor 651 and/or the airbag sensor 650, the control unit 103 switches to the safety mode. When receiving the signal 105, the control unit 103 switches the first switch 201 in the OFF-state to disconnect the first battery 121 from the braking system 610, the lighting system 620, the HVAC-system 630 and the entertainment system 640. The control unit 103 switches the fourth switch 204 in the ON-state to connect the second battery 122 to the braking system 610 and the lighting system 620. To prevent that the second battery 122 is connected via the fourth switch 204 to the HVAC-system 630 and the entertainment system 640, the control unit 103 switches the third switch 203 in the OFF-state. In response to the signal 105, the control unit 103 switches the fifth switch 505 into the OFF-state to disconnect the third battery 503 from the inverter 603 to stop the third battery 503 from transferring electric energy to the electric propulsion system.

In the safety mode, electric energy is transferred only from the second battery 122 to the braking system 610 and the lighting system 620, but not to the HVAC-system 630 and the entertainment system 640. Optionally, in the safety mode, no electric energy is transferred from the third battery 503 to the propulsion system.

Optionally, the electric vehicle 600 comprises a connector for connecting the first battery 121 to an external electric power supply. The connector is arranged to transfer electric energy from the external electric power supply to the first battery 121. The control unit 103 is configured, in response to the signal 105, to disconnect the first battery 121 from the external electric power supply.

FIG. 7 depicts a method for transferring electric energy according to an embodiment of the invention.

The method comprises the following steps. Step 700 is connecting a first battery 121 to a first group 131 and to a second group 132 to allow the first battery 121 to transfer electric energy to the first group 131 and the second group 132. The first group 131 comprises at least a first load 131*a-c*. The second group 132 comprises at least a second load 132*a-c*. The second group 132 is different from the first group 131.

Step 701 is receiving a signal 105 representative of a dangerous situation for the first battery 121. Step 702 is disconnecting the first battery 121 from the first group 131 and the second group 132 after receiving the signal 105. Step 703 is connecting a second battery 122 to the second group 132 to allow the second battery 122 to transfer electric energy to the second group 132 after receiving the signal 105.

Optionally, the method comprises the steps of transferring electric energy from the first battery 121 to the first group 131 and to the second group 132, stop transferring electric energy from the first battery 121 to the first group 131 and to the second group 132 after receiving the signal 105, and start transferring electric energy from the second battery 122 to the second group 132 after receiving the signal 105.

Optionally, step 703 of connecting the second battery 122 to the second group 132 comprises connecting the second battery 122 only to the second group 132.

Optionally, the method comprises the step of maintaining the second battery 122 at a fully charged state while the first battery 121 is transferring electric energy from the first battery 121 to the first group 131 and to the second group 132.

Optionally, step 701 of receiving the signal 105 comprises receiving the signal 105 representative of a temperature and/or a voltage of the first battery 121.

This document describes detailed embodiments of the invention. However, it must be understood that the disclosed embodiments serve exclusively as examples, and that the invention may be implemented in other forms.

The invention claimed is:

1. A battery management system for an electric vehicle, the battery management system comprising:

a first load connector connectable to a first group of at least a first load;

a second load connector connectable to a second group of at least a second load, the second group being different from the first group, a first switch;

a first battery connector connectable to a first battery;

a second battery connector connectable to a second battery;

a control unit;

wherein the battery management system is adapted to transfer electric energy from the first battery via the first switch to the first group and to the second group, wherein the battery management system is adapted to connect the second battery to the second group, wherein the control unit is configured to receive a signal representative of a dangerous situation for the first battery, wherein the dangerous situation is associated with a surrounding of the battery management system and/or associated with one or more internal characteristics associated with the first battery, wherein the control unit is configured, in response to the signal, to switch the first switch to disconnect the first battery from the first group and from the second group, and to start transferring electric energy from the second battery to the second group, wherein the signal is based on an activation of an airbag system or an activation of an autonomous emergency braking system.

2. The battery management system according to claim 1, wherein the control unit is adapted to receive the signal while the battery management system transfers electric energy from the first battery to the first group and to the second group.

3. The battery management system according to claim 1, wherein the control unit is configured to start transferring electric energy from the second battery to the second group only, in response to the signal.

4. The battery management system according to claim 1, comprising a charge controller connectable to the second battery, wherein the charge controller is configured to maintain the second battery at a fully charged state at least while the battery management system transfers electric energy from the first battery to the first group and to the second group.

5. The battery management system according to claim 1, comprising a first electric component and a second electric component, wherein the battery management system is adapted to connect the first group and the second group to each other via the first electric component, wherein the battery management system is adapted to connect the second battery to the second group via the second electric component, wherein the first electric component is adapted to block a transfer of electric energy from the second battery to the first group, and wherein the second electric component is adapted to block a transfer of electric energy from the first battery to the second battery.

6. The battery management system according to claim 5, wherein at least one of the first electric component and the second electric component comprises a diode.

7. The battery management system according to claim 5, wherein at least one of the first electric component and the second electric component comprises a further switch, wherein the control unit is configured to operate the further switch in response to the signal.

8. An electric vehicle, comprising:

the battery management system according to claim 1, the first group;

the second group;

the first battery;

the second battery;

a sensor adapted to provide the signal representative of a dangerous situation for the first battery, wherein the dangerous situation is associated with a surrounding of the battery management system and/or associated with one or more internal characteristics associated with the first battery.

9. The electric vehicle according to claim 8, wherein the second battery has a smaller energy capacity than the first battery.

10. The electric vehicle according to claim 8, wherein the first battery comprises a lithium-ion battery, and wherein the second battery comprises a lead-acid battery.

11. The electric vehicle according to claim 8, wherein the sensor is adapted to provide the signal based on a temperature and/or a voltage of the first battery.

12. The electric vehicle according to claim 11, comprising an electric propulsion system to propel the electric vehicle, and a third battery connected to the electric propulsion system via the battery management system to provide electric energy to the electric propulsion system, wherein a voltage of the third battery is higher than a voltage of the first battery and a voltage of the second battery.

13. The electric vehicle according to claim 12, wherein the battery management system comprises a second switch, wherein the third battery is connected to the electric propulsion system via the second switch to provide electric energy the electric propulsion system, wherein the control unit is configured to switch the second switch to disconnect the third battery from the electric propulsion system to stop the third battery transferring electric energy to the electric propulsion system, in response to the signal.

14. The electric vehicle according to claim 8, wherein the second group comprises a safety system of the vehicle.

15. The electric vehicle according to claim 14, wherein the safety system comprises at least one of:

a lighting system for providing light, a telecom system for providing telecommunication with an emergency service, an unlocking system for unlocking a door and/or a window of the vehicle, a braking system for braking the vehicle.

16. The electric vehicle according to claim 8, wherein the first group comprises at least one of:

a HVAC-system adapted to provide heating, ventilation and/or air condition of the vehicle, a seat heater arranged to provide heating of a seat in the vehicle, and an entertainment system for providing audio or video.

17. The electric vehicle according to claim 8, comprising the airbag system, wherein the sensor is adapted to provide the signal based on the activation of the airbag system.

18. The electric vehicle according to claim 8, comprising the autonomous emergency braking system for autonomously braking of the vehicle in an emergency, wherein the sensor is adapted to provide the signal based on the activation of the autonomous emergency braking system.

19. The electric vehicle according to claim 8, comprising a solar panel for generating electric energy based on solar energy, wherein the solar panel is connected to the first battery via the first switch to transfer electric energy to the first battery, wherein the control unit is configured, in response to the signal, to switch the first switch to disconnect the solar panel from the first battery.

20. The electric vehicle according to claim 8, comprising a connector for connecting the first battery to an external electric power supply, wherein the connector is arranged to transfer electric energy from the external electric power supply to the first battery, wherein the control unit is configured, in response to the signal, to disconnect the first battery from the external electric power supply.

21. A method for transferring electric energy, comprising the steps of:

connecting a first battery to a first group and to a second group to allow the first battery to transfer electric energy to the first group and the second group, wherein the first group comprises at least a first load, wherein the second group comprises at least a second load, the second group being different from the first group, receiving a signal representative of a dangerous situation for the first battery, wherein the dangerous situation is associated with a surrounding of a battery management system and/or with one or more internal characteristics associated with the first battery, disconnecting the first battery from the first group and the second group after receiving the signal, connecting a second battery to the second group to allow the second battery to transfer electric energy to the second group after receiving the signal, wherein the signal received in the step of receiving the signal is based on an activation of an airbag system or an activation of an autonomous emergency braking system.

22. The method according to claim 21, comprising the steps of:

transferring electric energy from the first battery to the first group and to the second group, stop transferring electric energy from the first battery to the first group and to the second group after receiving the signal, and start transferring electric energy from the second battery to the second group after receiving the signal.

23. The method according to claim 21, wherein the step of connecting the second battery to the second group comprises connecting the second battery only to the second group.

24. The method according to claim 21, comprising the step of maintaining the second battery at a fully charged state while the first battery is transferring electric energy from the first battery to the first group and to the second group.

25. The method according to claim 21, wherein the step of receiving the signal comprises receiving the signal representative of a temperature and/or a voltage of the first battery.

26. A control unit for use in the battery management system according to claim 1, or in the electric vehicle according to claim 8, wherein the control unit is configured to receive the signal representative of the dangerous situation for the first battery, wherein the dangerous situation is associated with a surrounding of the battery management system and/or with one or more internal characteristics associated with the first battery, wherein the control unit is configured, in response to the signal, to switch the first switch to disconnect the first battery from the first group and from the second group, and to start transferring electric energy from the second battery to the second group.

* * * * *